June 16, 1931.  R. W. STEVENS  1,810,628
AUTOMOBILE WHEEL BRAKE
Filed May 24, 1929   2 Sheets-Sheet 1

Inventor
R. W. Stevens
By Lacey & Lacey, Attorneys

June 16, 1931.　　　　R. W. STEVENS　　　　1,810,628
AUTOMOBILE WHEEL BRAKE
Filed May 24, 1929　　　2 Sheets-Sheet 2
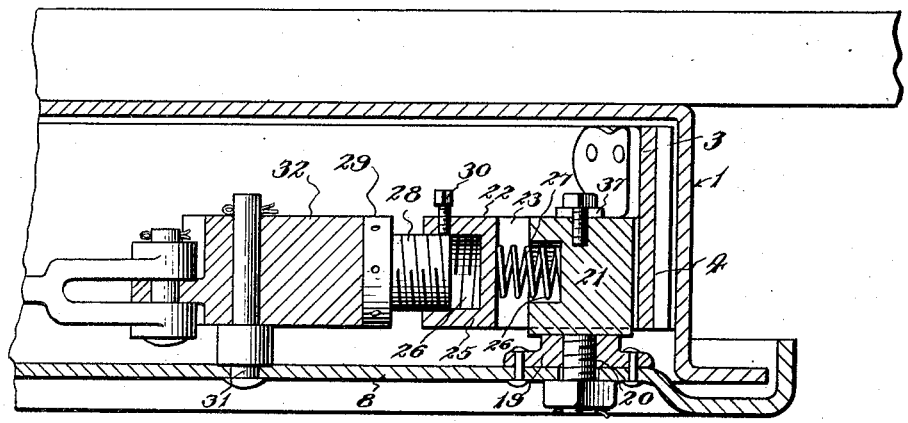
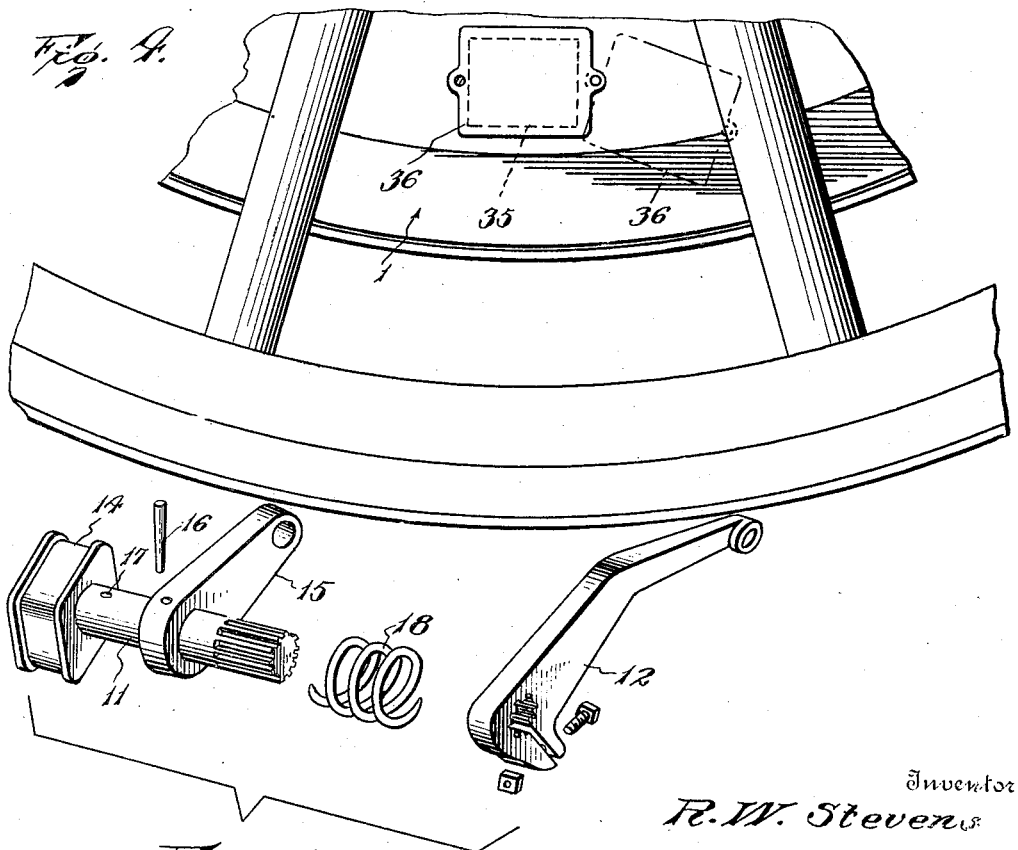
Inventor
R. W. Stevens
By Lacey & Lacey, Attorneys Patented June 16, 1931

1,810,628

UNITED STATES PATENT OFFICE

ROBERT W. STEVENS, OF GRANITE CITY, ILLINOIS

AUTOMOBILE WHEEL BRAKE

Application filed May 24, 1929. Serial No. 365,717.

The present invention is directed to improvements in automobile wheel brakes.

The primary object of the invention is to provide a device of this character wherein the brake band will be quickly expanded for frictionally engaging the brake drum for its entire circumference.

Another object of the invention is to provide novel means for holding the brake band anchored to the back plate.

Another object of the invention is to provide a device of this character which is simple in construction, efficient in operation, durable, and one which can be manufactured at a small cost.

With these and other objects in view, this invention resides in the novel features of construction, formation, combination and arrangement of parts to be hereinafter more fully described, claimed and illustrated in the accompanying drawings, in which:

Figure 3 is a sectional view on the line 3—3 of Figure 1.

Figure 4 is a fragmentary side view of a wheel.

Figure 5 is a perspective view showing the connection of one of the operating cams.

Figure 1:
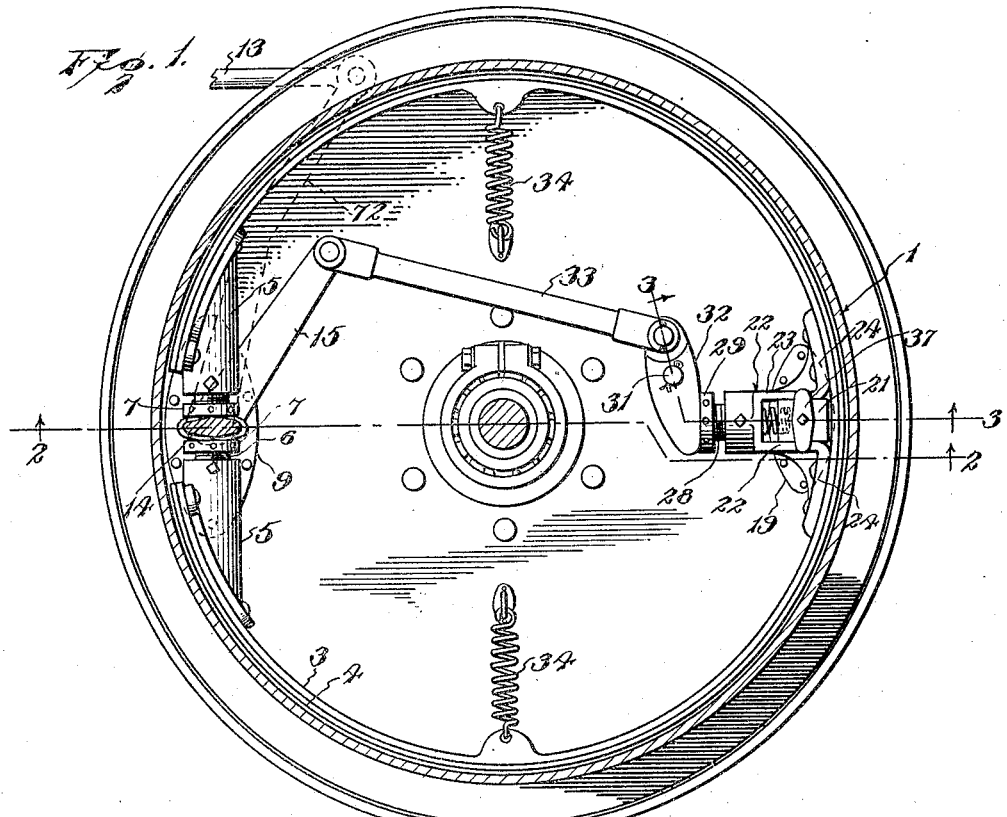
Figure 1 is a side view of the device.
Figure 2:
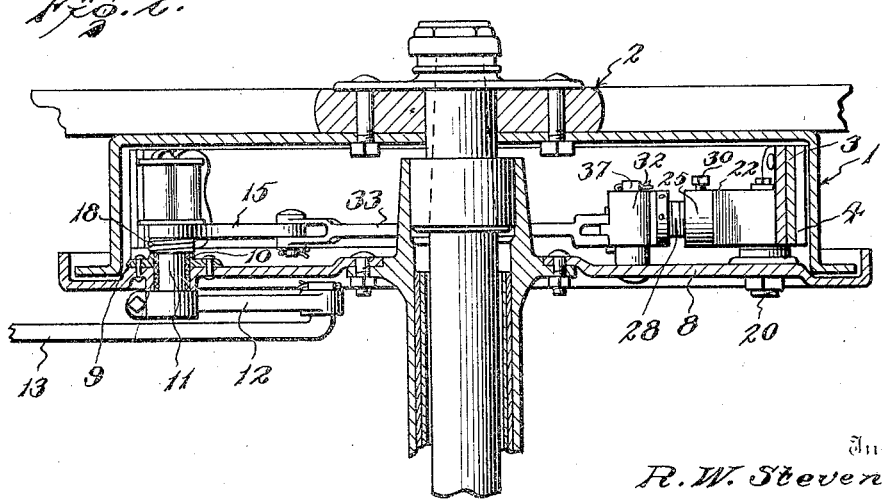
Figure 2 is a sectional view on the line 2—2 of Figure 1.

Referring to the drawings, 1 designates a brake drum secured to the wheel 2 in the customary manner and in which is confined the split brake band 3 equipped with the usual brake lining 4.

The terminals of the band are provided with posts 5 into the inner opposed ends of which are threaded screws 6, said screws having circular heads 7 carried thereby and capable of being rotated to adjust the screws.

A back plate 8 is secured to the axle housing and has secured upon its side within the drum a plate 9 in which is formed a bearing 10, and in this bearing is journaled the shaft 11, said shaft being also extended through and journaled in the plate 8 and having its outer end engaged with the lever 12 operable through the medium of the brake actuating rod 13. The rod 13, as customary, is connected with the brake pedal of the car. The inner end of the shaft 11 has fixed thereon a cam 14 disposed between and bearing against the screw heads 7 and an arm 15 is fixed to the shaft 11 by a pin 16 which is passed through said arm and into the seat 17 of the shaft. A coil spring 18 encircles the shaft 11 and is interposed between the arm 15 and the bearing 10 and serves to prevent rattling.

The back plate 8 has a plate 19 riveted thereto, preferably at a point diametrically opposite the plate 9, and in which is supported a bolt 20, said bolt having a block 21 on its inner end and being secured in place by a nut fitted on its outer end and turned home against the back plate. A frame 22 cooperates with the block 21 and has its sides 23 terminating in flanges 24 adapted to be riveted to the brake band at opposite sides of the block. It will be observed that the frame 22 may slide upon the block 21. The block 21 has a socket 26 formed therein for seating the outer end of the coil spring 27, the inner end of which bears against the bar 25 of the frame, said spring serving to normally urge the frame inwardly to draw the central part of the brake band away from the drum.

Threaded in the socket 26' of the bar 25 is a screw 28 having a circular head 29, said screw being adjustable to compensate for wear upon the lining. The screw 28 is held against accidental rotation by the set screw 30 mounted in the bar 25 of the frame and bearing against the adjusting screw.

A pin 31 is supported by the back plate 8 at a point inward from the screw 28 and at one side of a diameter of the drum passing axially through the adjusting screw and the frame and pivotally mounted on said pin is a cam 32 having one end bearing against the end of the screw head 29. A link 33 connects the opposite end of the cam with the arm 15, as clearly shown in Figure 1 of the drawings.

Coil springs 34 are provided at diametrically opposite points of the drum and approximately midway the center and ends of the band on radial lines of the drum, each having one end connected to the brake band 3 and its opposite end connected to the axle housing 8, and serve to normally contract the band.

Obviously, when the brake pedal is forced inwardly, the lever 12 will be rocked, thus rocking the shaft 11 to actuate the cam 14. As the cam 14 rocks, the screws 6 will be moved away from each other to expand the band for frictionally engaging the brake drum. As the arm 15 swings, its movement will be transmitted through the link 33 to rock the cam 32, thus forcing the frame 22 outwardly to exert pressure upon the band at the adjacent point. It will thus be seen that the band will be expanded at three points, thus causing the outer periphery thereof to more effectively engage the brake drum. When the brake pedal is released the spring 27 acts to move the frame 22 inwardly, thus rocking the cam 32 reversely as well as the cam 14 to free the band while the springs 34 act directly on the brake band to draw it from the drum.

The brake drum is provided with an opening 35 normally closed by a door 36. Obviously, the wheel can be rotated so as to bring the screws 6 and screw 28 in registration with the opening in order that adjustment can be made.

A cross plate 37 is fixed to the block 21 to prevent lateral movement of the frame 23.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What is claimed is:

1. The combination with a brake drum, and a back plate, of a split brake band confined within the drum, a block anchored to the back plate, a frame slidable on the block and secured to the band between the ends thereof, a cam mounted between and bearing against the terminals of the band, a second cam pivotally supported by the back plate and bearing against the inner end of said slidable frame, yieldable means for holding said frame to said cam, and means for simultaneously rocking the cams for spreading the terminals of the band and sliding the frame upon the block to cause the band to frictionally engage the drum.

2. The combination with a brake drum, and a back plate, of a split brake band confined within the drum, a block fixedly secured upon the back plate, a frame slidable on the block and secured to the brake band between the ends thereof, a screw adjustably mounted in the inner end of the frame, a cam pivoted on the back plate and bearing against the screw, a cam disposed between the terminals of the brake band, an arm for operating the last named cam, and link connections between the latter cam and the first mentioned cam whereby said cams may be simultaneously rocked for spreading the terminals of the band and sliding the frame outwardly to expand the band against the drum.

3. The combination with a brake drum, and a back plate, of a split brake band confined within the drum, screws adjustably connected with the terminals of the band, a block anchored upon the back plate, a frame slidable on the block and secured to the brake band between the ends thereof, a spring engaged with the block and the frame for urging the frame inwardly, a screw adjustably connected with the inner end of the frame, a cam movable between the screws of the band terminals, a cam pivotally mounted on the back plate and bearing against the inner end of the screw in the frame, and means for simultaneously rocking the cams to spread the terminals and slide the frame upon the block to expand the brake band against the drum.

In testimony whereof I affix my signature.

ROBERT W. STEVENS. [L. S.]